United States Patent [19]

McElwain

[11] 4,244,165
[45] Jan. 13, 1981

[54] HARVESTER APPARATUS

[75] Inventor: Kenneth L. McElwain, Ruskin, Fla.

[73] Assignee: Kennco Manufacturing, Inc., Ruskin, Fla.

[21] Appl. No.: 44,007

[22] Filed: May 31, 1979

[51] Int. Cl.³ .......................................... A01D 45/00
[52] U.S. Cl. .................................. 56/327 R; 171/14; 209/665
[58] Field of Search ................. 56/327 R, 328, 121.4, 56/121.41, 119; 171/14, 15; 130/30 R, 30 V, 30 B, 30 E, 30 G; 209/664, 665

[56] References Cited

U.S. PATENT DOCUMENTS

| 2,867,322 | 1/1959 | Weisenfeld | 209/665 |
|---|---|---|---|
| 3,151,434 | 10/1964 | Hamel | 56/296 |
| 3,193,020 | 7/1965 | Button | 171/14 |
| 3,337,049 | 8/1967 | Carlsen | 209/665 |
| 3,498,034 | 3/1970 | Woitt | 130/30 R |
| 3,736,734 | 6/1973 | Pavel | 56/119 |
| 4,147,017 | 4/1979 | Cortopassi et al. | 56/327 R |

Primary Examiner—Robert A. Hafer
Attorney, Agent, or Firm—Arthur W. Fisher, III

[57] ABSTRACT

A harvester apparatus comprising a plurality of discrete stations disposed in operative communication relative to each other on a self-propelled mobile chassis to remove plants from the earth and separate the fruit or vegetable from the stem or vine including a cutting station comprising an adjustable cutter having an adjustable positioner station disposed adjacent thereto to engage the plants and orient the plants for cutting by the cutter, a first transport station comprising a diagonally disposed conveyor having a plurality of lateral positioned cross members or retainers formed thereon disposed to receive plants from the cutter station and a feed element to direct plants from the cutter station to the first conveyor, a stripper station adjacent the first transport station to receive the plants therefrom comprising at least one pair or set of counter-rotating separator members to separate the fruit or vegetables from the vine or stem, a culling station comprising at least one movable open mesh conveyor disposed adjacent and substantially perpendicular to the stripper station to receive fruit or vegetables therefrom to selectively retain fruit or vegetables and transport the fruit or vegetables to a second transport station comprising a side conveyor disposed substantially perpendicular and immediately adjacent and on the same plane as the culling station to receive fruit or vegetables therefrom and a cross conveyor disposed rearwardly and substantially perpendicular to the side conveyor to receive fruit and vegetables therefrom and a discharge station disposed adjacent the second transport station to receive fruit or vegetables therefrom and discharge them from the harvester apparatus.

20 Claims, 16 Drawing Figures

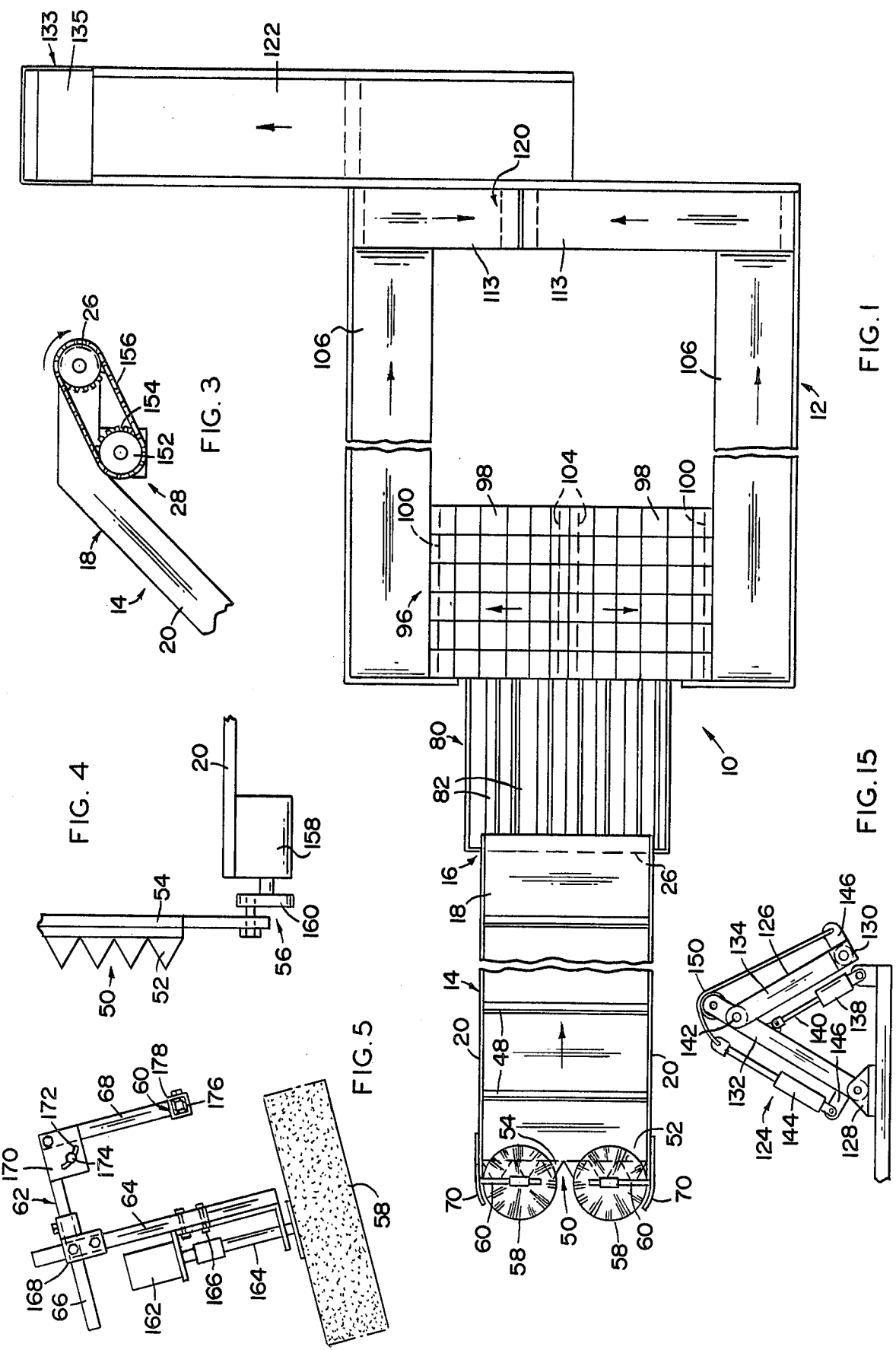

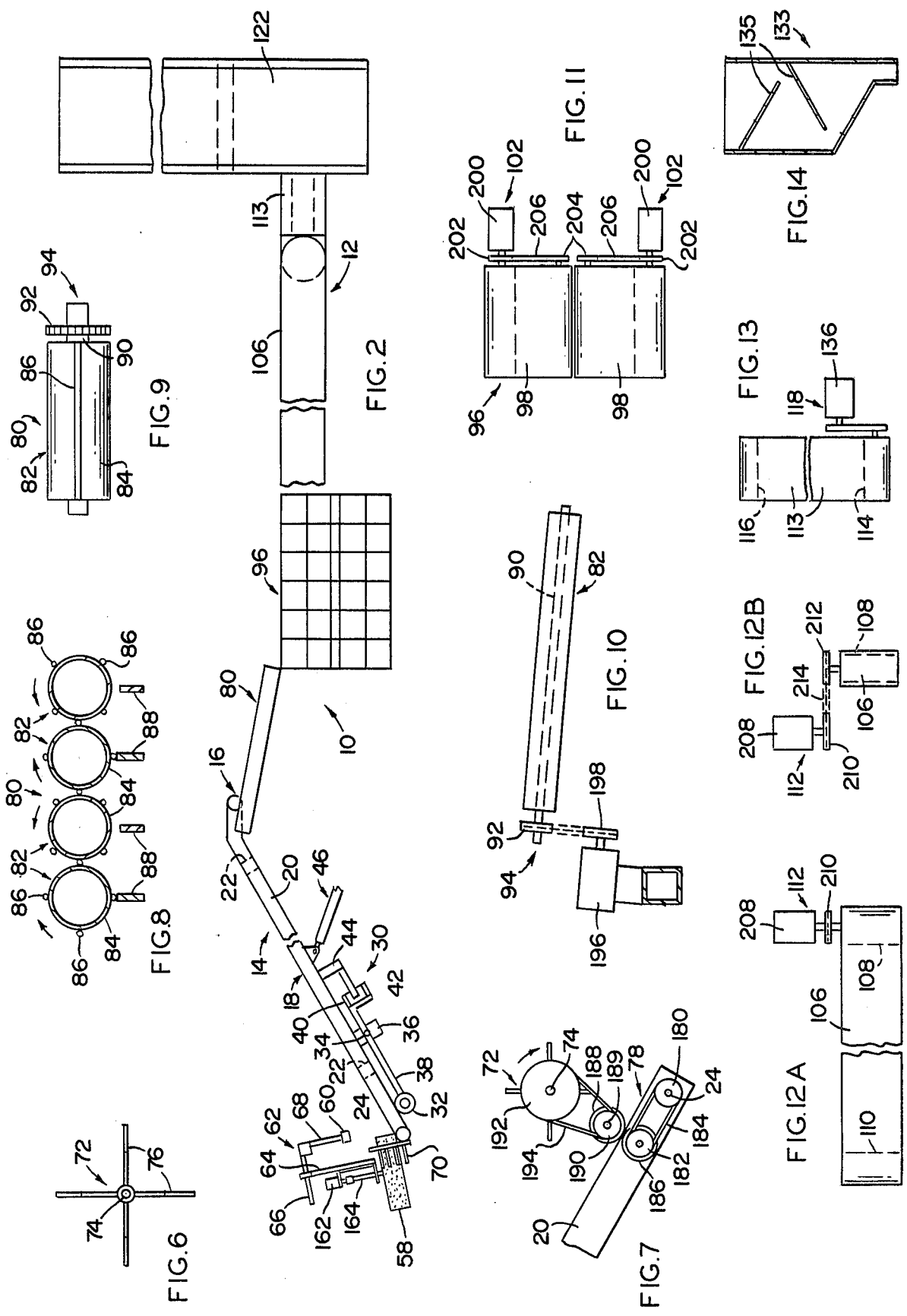

HARVESTER APPARATUS

BACKGROUND OF THE INVENTION

1. Field of the Invention

A harvester apparatus comprising a plurality of discrete stations disposed in operative communication relative to each other on a self-propelled mobile chassis to remove plants from the earth and separate the fruit or vegetable from the stem or vine.

2. Description of the Prior Art

Harvesting devices for mechanically severing and conveying plants to a suitable mechanism for separating the fruit from the vines have long been available. Unfortunately, many harvesting devices are not well adapted to certain types of plants. As a result manual harvesting operations continue today. Particularly, tomatoes have been difficult to harvest by machine and only recently have there been proposed automatic harvesting devices for tomato plants.

Even so, several limitations, such as damage and dirt affecting product quality remain. Commonly, mechanical harvesters separate the fruit from the vine by imparting energy to the fruit or vine, so that the inertia of the fruit effects removal. Performance of this type of system is essentially independent of the orientation of the vine with respect to the separator components. The tomato vines are cut off underground, are lifted mechanically from the ground along with some or much dirt, and then the vines are shaken. Since the orientation of the vine is of small consequence in such systems, no attempt is made to control it. The energy imparted to a shaker is transferred to the fruit or vine, and the inertia of the fruit effects removal. Shaking inevitably results in some fruit damage due to this impartation of energy, as the fruit strikes other fruit or parts of the shaking apparatus.

One such harvesting apparatus disclosed in U.S. Pat. No. 3,070,944 includes a shaker means for physically separating the vegetable from the vines in combination with a cutting means for severing plants from the ground. The shaker means includes a plurality of endless looped belts in side-by-side relationship, adjacent belts being spaced from each other by a distance sufficient to permit the plant fruit, such as a tomato, to fall therebetween after becoming separated from the vine. The fruit falls to a level below the belts to a suitable collecting means such as a conveyor. The vines are received in a suitable discarding means for disposal. This is then fed to a manual picking table.

Another example is described in U.S. Pat. No. 3,552,398 which discloses a roll set for snapping the vine crop such as the cucumber harvest or the like. The growing vines are severed at the ground and elevated to the snapping rolls that form a nip throat to grasp the vines and pull them through the rolls. The rolls are urged together with considerable force to prevent passage of cucumbers through the rolls. The cucumbers are snapped off the rolls at the nip throat and dropped down into a collector.

Other examples of harvesting devices are disclosed in U.S. Pat. Nos. 3,436,902; 3,437,151; 3,455,453; 3,457,711; 3,541,979; 3,548,575; 3,566,891 and 3,587,217.

Unfortunately a real need for an efficient, reliable machine which avoids or minimizes damage to the fruit or vegetable still exists.

SUMMARY OF THE INVENTION

The present invention relates to a harvester apparatus. More specifically, the harvester apparatus comprises a plurality of discrete stations disposed in operative communication relative to each other on a self-propelled mobile chassis to remove plants from the earth and separate the fruit or vegetable from the stem or vine.

A first transport station comprising a frame is pivotally mounted to the forward portion of the self-propelled mobile chassis. A first conveyor comprising a continuous belt having a plurality of lateral positioned cross-members or retainers formed thereon is operatively mounted on the frame. A control means comprising a control sensor and control switch is coupled between the self-propelled chassis and lower portion of the frame to control the vertical position of the first transport station relative to the earth as more fully described hereinafter.

A cutting station comprising a mower type cutter is coupled to the forward portion of the first transport station. Extending outwardly in advance of the cutting station is a positioner station comprising a pair of adjustable counterrotating brushes disposed on opposite sides of the frame to engage the plants and orient the plants for cutting by the cutter and a pair of comb elements disposed to engage corresponding brushes to keep the brushes free of debris.

The first transport station further includes a rotatable mounted feed element comprising a substantially horizontal axle having at least one paddle element extending outwardly therefrom to direct the plants from the cutter station to the first transport station.

A stripper station is disposed adjacent the upper portion of the first transport station to receive the plants therefrom. The stripper station comprises a plurality of counterrotating separator members to separate the fruit or vegetables from the vine or stem. Each separator member comprises a substantially cylindrical element having at least one rib formed on the outer surface thereof to cooperate with the next adjacent rib to separate the fruit from the vine in a twisting manner.

Immediately rearward and below the stripper station is a culling station comprising a pair of substantially horizontal open mesh conveyors rotating in opposite directions outwardly toward opposite sides of the harvester apparatus to move fruit and vegetables from the stripper station to the second transport station.

The second transport station comprises a pair of side conveyors disposed on opposite sides of the harvester apparatus and extending rearwardly to the rear portion thereof in combination with a corresponding pair of cross conveyors extending laterally across the rear portion of the harvester apparatus. The pair of cross conveyors rotate inwardly to feed a discharge station disposed adjacent the inner adjacent portions of the cross conveyors.

As previously described the chassis for the harvester is self-propelled, with 4-wheel drive, front and rear wheels steerable. The component parts including conveyors, stripper, culler, cutter and brushes are hydraulically powered from a central system.

In operation the counterrotating brushes pick up the vine with its fruit, such as tomatoes, and orients them vertically for severing the vine from its root system by means of the mower type cutter. The severed plant and fruit, assisted by the rotating paddle wheel are placed by the brushes on the inclined endless belt conveyor, positioned between the brushes and rotating in the direction of the conveyor travel. The brushes are kept free of weed and debris by the combs mounted on the conveyor frame.

The relationship of the cutter, brushes, paddle wheel and the conveyor to ground level is maintained at the proper height by the control means of the sensing wheels and the limit switch. A pair of hydraulic cylinders is attached to the chassis and conveyor which in response to signals from a switch actuated by the sensing wheels, raises or lowers the conveyor details to compensate for variations in ground level.

The inclined conveyor and cross-members or retainer support the vine and preclude the loss of any marketable fruit that may have separated from the vine. This is an improvement over open type arctuated hook conveyors which lose a portion of the marketable fruit at this point.

The vine and fruit are delivered by the first transport station to the counterrotating separator members. These separator members strip the foliage and vine from the fruit, and the foliage is carried downward and chuted to the ground. The separator members are mounted to the chassis at a slight angle, such as 5°, so that the separated fruit feeds by gravity to the culling station.

The open mesh conveyors of the culling station are identical except for direction or rotation. They consist of an endless open wire mesh in which the square openings are sized to retain the desired fruit and smaller sizes will drop through and are chuted to the ground. These openings cradle the fruit, transporting and discharging it gently to the side conveyors of the second transport station. This is an improvement in the method where fruit must be dropped while sizing, with the possibility of bruising.

The side conveyors are endless belts of a suitable resilient material to avoid damage to the fruit. Telescoping (for transport and storage) catwalks may be mounted to the chassis along each side conveyor to accommodate workers for visual color sorting.

The conveyors deliver the fruit to the cross conveyors which are of the same general construction. In turn, the fruit is delivered to the discharge conveyor, which is also an endless belt, cleated conveyor, that can be elevated and extended to accommodate the different heights and distances to the harvesting bin boxes.

An elevated control cab is located above the general area where the operator has access to all controls for the operation of the harvester.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is a top schematic view of the harvester apparatus.

FIG. 2 is a side schematic view of the harvester apparatus.

FIG. 3 is a partial detailed view of the first conveyor drive means.

FIG. 4 is a partial detailed top view of cutter drive means.

FIG. 5 is a partial detailed side view of the positioner station.

FIG. 6 is a detailed side view of the feed element.

FIG. 7 is a partial detailed side view of the feed drive means.

FIG. 8 is a partial detailed cross sectional end view of the stripper station.

FIG. 9 is a detailed side view of a separator member.

FIG. 10 is a partial detailed view of the stripper drive means.

FIG. 11 is a top view of the culling drive means.

FIG. 12A is a detailed top view of the second transport drive means.

FIG. 12B is an end view of the side view of the second transport drive means.

FIG. 13 is a detailed top view of cross conveyor drive means.

FIG. 14 is a detailed side view of a receiving bin with baffles.

FIG. 15 is a detailed side view of discharge station.

Similar reference characters refer to similar parts throughout the several views of the drawings.

DETAILED DESCRIPTION OF THE PREFERRED EMBODIMENT

The present invention relates to a harvester apparatus generally indicated as 10 in FIGS. 1 and 2. More specifically the harvester apparatus 10 comprises a plurality of discrete stations disposed in operative relationship relative to one another on a self-propelled mobile chassis 12 to remove plants from the earth and separate the fruit or vegetables from the stem or vine.

The plurality of discrete stations comprises a first transport station generally indicated as 14 including a frame pivotally mounted to the forward portion of the self-propelled mobile chassis 12 by member 16. A first conveyor comprising a continuous belt 18 is operatively mounted on side frame members 20 held in fixed spaced relationship by cross frame members 22 and disposed diagonally upward pivot member 16. The continuous belt 18 is mounted between idle roller 24 and drive roller 26 coupled to a first conveyor drive means 28 (detailed in FIG. 3) to rotate the belt 18 upwardly toward the upper portion thereof as more fully described hereinafter. The first transport station 14 further includes a control means generally indicated as 30 to adjust the forward portion of the first transport station 14 vertically relative to the ground or earth as fully described hereinafter. The control means 30 (FIG. 2) comprises a sensing means including a pair of sensing wheels 32 rotatably attached to the frame members 20 by pivot axle 34 extending through a pair of base elements 36 by sensing arm 38. Attached to the upper portion of sensing arm 38 is an upper and lower limit sensor 40 and 42 respectively. A control switch 44 is coupled to a positioner or a pair of hydraulic cylinders 46 disposed between opposite sides of the conveyor frame and the chassis 12 such that the hydraulic cylinders 46 (coupled to hydraulic motor not shown) respond to signals from the control switch 44 to raise or lower the conveyor belt 18 to compensate for variations in the ground or earth level. The inclined continuous conveyor belt 18 further includes a plurality of substantially L-shaped cross members or retainers 48 to support the vine and preclude the loss of any fruit that may be separated from the vine at this point of the operation.

This is an improvement over the open type arcuated hook conveyors normally found in the art which lose a portion of the marketable fruit at this point.

As shown in FIGS. 1 and 4, operatively coupled to the forward portion of the frame on side frame member 20, is a cutting station generally indicated as 50 comprising a mower type cutter bar including a stationary element 52 and oscillating cutter element 54 operatively coupled to a cutter drive means 56 to move the oscillating cutter element 54 laterally relative to the stationary cutting element 52 to provide the cutting action as more fully described hereinafter.

Extending outwardly in advance of the cutting station 50 is a positioner station comprising a pair of adjustable counterrotating brushes each indicated as 58 attached to side frame members 20 by connecting elements 60. As best shown in FIG. 5 the adjustable brushes 58 are mounted to connecting or coupling element 60 by frame 62 comprising support arms 64, 66 and 68 to permit adjustment of the brushes 58 both laterally and longitudinally relative to the forward portion of the harvester apparatus 10 or cutting station 58 as well as pivot in the vertical axis to account for variations in the planting rows. The positioner station further includes a pair of comb elements 70 extending outwardly from the side frame members 20 and in operative engagement with the corresponding brushes 58 to keep the brushes 58 free of debris during rotation thereof.

The first transport station 14 further includes a rotatably mounted feed element generally indicated as 72 (FIGS. 6 and 7). The feed element 72 comprises a substantially horizontal axle 74 having a plurality of paddle or feed members 76 extending outwardly therefrom to direct the plants from the cutter station 50 to the first transport station 14. The feed element 72 is driven or rotated by feed drive means 78 as more fully described hereinafter.

As best shown in FIG. 1, a stripper station generally indicated as 80 comprises a plurality of counterrotating separator members 82. As best shown in FIGS. 8 and 9 each separator member 82 comprises a substantially cylindrical roller 84 having a plurality of rod-like elements 86 fixedly attached to the outer portion or periphery thereof. Disposed immediately below each separator member 82 is a corresponding stripper plate 88 which remove the plant foliage and vine from the fruit as more fully described hereinafter. The spacing of the rollers 84 is such that the stripper rods 86 rotate immediately adjacent the next roller 84 and corresponding stripper plate 88. Each separator member 82 is mounted on a stripper axle 90 coupled to a spur gear 92 operatively interconnected to adjacent spur gears 92 and coupled to a stripper drive means 94 to provide the counterrotating action. The spacing between adjacent separator members 82 is such that the foliage is effectively stripped from the fruit or vegetable without damaging the fruit and allows the fruit to flow by gravity to the culling station generally indicated as 96 which is superior to other harvesters that rely on the preplanting of cords or oscillating mechanisms such as a straw walker which allow the fruit to drop with the possibility of bruising after separation from the foliage. As best shown in FIG. 2 the stripper station 80 is inclined rearwardly at approximately a 5° degree angle to gravity feed the fruit to the culling station 96.

Disposed immediately rearward and below the stripper station 80 is the culling station 96 comprising a pair of substantially horizontal open mesh conveyors each indicated as 98 rotated in opposite directions on drive axles 100 coupled to culling drive means 102 and idler rollers 104. As disclosed, the open mesh conveyors 98 are disposed laterally across the width of the harvester apparatus 10 to receive fruit from the stripper station 80 and carry the fruit greater than a predetermined size to each side of the harvester apparatus 10. The fruit and vegetables less than the predetermined size as well as the debris remaining from the stripper station 80 is permitted to fall freely through the counterrotating open mesh conveyors 98 and chuted to the ground or to a receiving bin (not shown).

A second transport station is disposed to receive fruit and vegetables from the culling station 96 as described more fully hereinafter. Specifically the second transport station comprises a pair of side conveyors each generally indicated as 106 extending longitudinally along opposite sides of the harvester device 10. Each side conveyor 106 is operatively coupled between a drive roller 108 and idler roller 110. The drive roller 108 is operatively coupled to drive means 112 to continuously rotate the continuous belt 106 rearwardly along opposite sides of the harvester apparatus 10.

A pair of cross conveyors each comprising a continuous conveyor belt 113 extend laterally across the rear portion of the harvester apparatus 10. The cross conveyors 113 each are operatively mounted on a drive roller 114 and idler roller 116 to continuously rotate inwardly relative to each other and feed the fruit or vegetable inwardly to the midportion of harvester apparatus 10. The drive roller 114 is coupled to cross conveyor drive means 118. Disposed at the inner ends of cross conveyor belts 112 is a receiving bin 120 which slows the fruit to receive the fruit and vegetables from the cross conveyors 113. Disposed immediately adjacent rearward and lower from the inner portion of the bin 120 is a discharge station 124 (FIG. 15) comprising a continuous conveyor belt 126 operatively mounted to the frame by the drive roller 128 having an idler roller 130 disposed at the opposite end thereof on the frame comprising a first and second pair of side members 132 and 134 respectively to discharge the fruit and vegetables from the entire harvester apparatus 10.

As shown in FIGS. 1 and 14, a discharge bin 133 including baffles 135 is affixed to the frame to receive fruit from conveyor belt 126.

The drive roller 128 is coupled to a drive means similar to that previously described. As best shown in FIG. 15, the first pair of side members 132 are adjustable vertically by means of vertical adjustment means comprising a hydraulic cylinder and arm 138 and 140 respectively. Similarly the second pair of side frame members 134 are adjustable about axle 142 by means of hydraulic cylinder 144 coupled at one end of the frame thereof adjacent the drive roller 128 and flanges 146 interconnected by means of a wire rope 148 extending over idler 150 attached to the outer or upper portion of said frame members 132. Conveyor belt 126 is driven similar to those previously described.

As best shown in FIG. 3, the first conveyor drive means 28 comprises a hydraulic motor 152 coupled to the frame and interconnected to drive sprockets 154 by means of chain 156 which in turn are coupled to the drive roller 26. As best shown in FIG. 4, the cutter drive means 56 comprises a hydraulic motor 158 coupled to side frame members 20 and interconnected to the oscillating cutter 54 by eccentric 160. As best shown in FIG. 5, the brushes 58 are rotated by means of drive means 162 coupled to the brushes by axle 164. The entire brush and motor or drive assembly is pivotally coupled to arm 64 by means of mounting elements 166. In turn, arms 64 is adjustably vertically through coupling means 168 interconnecting the arm 64 to support arm 66. Support arm 66 in turn is pivotally mounted to support arm 68 by means of plates 170 including arcuate portions and fastening or securing means 172 and 174 respectively. Moreover supporting arm 68 is coupled to cross frame 176 by coupling element 178 to permit lateral adjustment of the brushes 58. As best shown in FIG. 7, the feed drive means 78 comprises a drive sprocket 180 coupled to the idler pulley shaft 24 which is in turn operatively coupled to a sprocket 182 and chain 184. First and second spur gears 186 and 188 are operatively interfaced. The second spur gear 188 is mounted on shaft 189 together with first drive wheel 190 coupled to a second drive wheel 192 by V-belt 194 to rotate the axle 74. As best shown in FIG. 10, the first separator member 82 is operatively interconnected to drive means 92 comprising a hydraulic motor 196 mounted on the chassis and interconnected to drive shaft 90 by means of chain and sprocket assembly 198. As best shown in FIG. 11, culling drive means 102 comprises a motor 200 coupled to drive axle 100 by a pair of sprockets 202 and 204 connected by chain drive 206. As best shown in FIGS. 12A and 12B second transport drive means 112 comprises motor 208 interconnected to the drive roller 108 by means of drive sprockets 210 and 212 interconnected by chain drive 214.

The mobile chassis 12 for the harvester apparatus 10 is self-propelled, with 4-wheel drive, front and rear wheels steerable. The component parts including conveyors, stripper, culler, cutter bar and brushes are hydraulically powered from a central system.

In operation, the counterrotating brushes 58 which may be movably adjusted as previously described pick up the vine with its fruit, such as tomatoes, and orients them vertically for severing the vine from its root system by means of a mower type cutter elements 52 and 54. The severed plant and fruit, assisted by a rotating feed element 72 are placed by the brushes 58 on an inclined endless belt conveyor 18. The brushes 58 are kept free of weed and debris by the combs 70 mounted on the conveyor frame.

The relationship of the cutter elements 52 and 54 and the conveyor 18 to ground level is maintained at the proper height by the control means 30 by the pair of sensing wheels 32 through hydraulic cylinder or positioners 46, in response to signals from switch 44. The cylinders 46 raise or lower the conveyor belt 18 and its components to compensate for variations in ground level.

The inclined conveyor 18 and retainers 48 support the vine and preclude the loss of any marketable fruit that may have separated from the vine at this point in the operation. This is an improvement over open type arcuated hook conveyor which lose a portion of the marketable fruit at this point.

The vine and fruit are delivered by the conveyor belt 18 to the separator members 82. These separator members 82 strip the foliage and vine from the fruit, and the foliage and vine are carried downward and chuted to the ground. The separator members 82 are mounted to the chassis at a slight angle, such as 5° so that the separated fruit flows by gravity to the culling station 96.

The plant foliage and vine, especially the large root stalk, is trapped by the stripper rods 86 and carried downward to a stripping plates 88 which removes it from the rollers 84 and discharges it for chuting to the ground. The spacing of the rollers 84 is such that the foilage is effectively stripped from the fruit, without damage to the fruit, and allows the fruit to flow by gravity to the next operation, and is superior to other harvesters that rely on pre-planted cords or oscillating mechanisms, such as a "straw-walker", which allow the fruit to drop, with the possibility of bruising, after separation from the foliage.

The conveyors 98 of the culling station 96 are identical except for direction of rotation. They consist of an endless open wire mesh in which the square openings are sized to retain the desired fruit and smaller sizes will drop through to the ground. These openings cradle the fruit, transporting and discharging it gently to the side conveyors 106 of the second transport station an improvement in the method where fruit must be dropped with the possibility of bruising.

The side conveyors 106 are endless belt of a suitable resilient material to avoid damage to the fruit. Telescoping (for transport and storage) catwalks may be mounted to the chassis along each conveyor to accommodate workers for visual color sorting.

The side conveyors 106 deliver the fruit to the cross conveyors 113 which are of the same general construction. They in turn deliver the fruit to bin 120 and discharge station or the discharge conveyor 126 which is also an endless belt, cleated conveyor, that can be elevated and extended to accommodate the different heights and distances to the harvesting bin boxes. Transfer areas between adjacent stations may be foam padded to minimize damage to the fruit or vegetable.

An elevated control cab (not shown) is located above the chassis 12 where the operator has access to all controls for the operation of the harvester.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A harvester apparatus comprising a plurality of discrete stations disposed in operative communication relative to each other on a self-propelled mobile chassis to remove plants from the earth and separate the fruit or vegetable from the stem or vine including a cutting station comprising a cutter having a positioner station disposed adjacent thereto to engage the plants and orient the plants for cutting by said cutter, a first transport station comprising a diagonally disposed first conveyor disposed to receive plants from said cutter station and a stripper station adjacent said first transport station to receive the plants to separate the fruit or vegetables from the vine or stem, said positioner station being adjustable laterally relative to said cutter station, said positioner station comprising a pair of brushes disposed on opposite sides of said cutter in operative communication therewith and said positioner station further includes a pair of comb elements extending in operative relationship to said brushes to continuously clean said rotating brushes of debris.

2. A harvester apparatus of claim 1 wherein said cutter further comprises a control means to vertically adjust said cutter relative to the earth to maintain proper vertical separation relative thereto.

3. The harvester apparatus of claim 2 wherein the cutter comprising a stationary cutter element and a movable cutter element coupled to a drive means disposed in operation relation relative to each other to oscillate said movable cutter to cut the plant from the earth.

4. The harvester apparatus of claim 2 wherein said control means comprises a control sensor coupled to at least one movable element coupled between the chassis and said first transport station.

5. The positioner of claim 1 wherein said positioner station is adjustable longitudinally and vertically relative to said cutter.

6. The harvester apparatus of claim 1 wherein said conveyor includes at least one laterally disposed retainer element to retain plants deposited thereon from said cutter station.

7. The harvester apparatus of claim 1 wherein said first transport station further includes a feed element disposed in operative relationship between said cutter and said first transport station to feed the plants from said cutter station to said first transport station.

8. The harvester apparatus of claim 7 wherein said feed elements comprises a horizontally disposed rotatably mounted axle having at least one feed member extending outwardly therefrom to engage plants from said cutting station.

9. The harvester apparatus of claim 1 wherein said stripper comprises at least one pair of counterrotating members having their outer periphery immediately adjacent each other.

10. The harvester apparatus of claim 9 wherein each said member comprises a cylindrical member having at least one rib formed thereon to engage the plants.

11. The harvester apparatus of claim 9 wherein said cylindrical members are substantially perpendicular to said first conveyor.

12. The harvester apparatus of claim 1 further including a culling station configured to receive fruit or vegetables from said stripper station to selectively retain fruit or vegetables of a predetermined size and transport fruit and vegetables to a second transport station.

13. The harvester apparatus of claim 12 wherein said culling station comprises at least one movably mounted open mesh conveyor disposed adjacent to said stripper station.

14. The harvester apparatus of claim 13 wherein said culling station comprises a pair of open mesh movably mounted conveyors disposed adjacent to one another and rotating in opposite directions to feed the fruit or vegetables to the sides of said harvester apparatus.

15. The harvester apparatus of claim 13 further including a second transport station to move fruit or vegetables longitudinally relative to said harvester apparatus.

16. The harvester apparatus of claim 15 wherein said second transport station comprises at least one side conveyor disposed to receive the fruit or vegetables from said culling station.

17. The harvester apparatus of claim 16 wherein said second transport station further includes a cross conveyor disposed adjacent to said side conveyor to receive fruit or vegetable therefrom.

18. The harvester apparatus of claim 17 wherein said second transport station comprises a pair of side conveyors disposed on opposite sides of said harvester apparatus and a corresponding pair of cross conveyors disposed adjacent the rear portion of said corresponding side conveyors.

19. The harvester apparatus of claim 1 wherein said second transport station comprises a chute disposed between the inner portions of said cross conveyors.

20. The harvester apparatus of claim 19 further including a discharge station to receive fruit or vegetables from said chute.

* * * * *